(12) United States Patent
Hosokawa (10) Patent No.: US 9,964,945 B2
(45) Date of Patent: May 8, 2018

(54) PROCESS FLOW CHECKING SYSTEM, RECORDING MEDIUM, AND PROCESS FLOW CHECKING METHOD

(71) Applicant: TOSHIBA MEMORY CORPORATION, Tokyo (JP)

(72) Inventor: Yasuhiro Hosokawa, Mie (JP)

(73) Assignee: Toshiba Memory Corporation, Tokyo (JP)

( * ) Notice: Subject to any disclaimer, the term of this patent is extended or adjusted under 35 U.S.C. 154(b) by 389 days.

(21) Appl. No.: 14/644,568

(22) Filed: Mar. 11, 2015

(65) Prior Publication Data

US 2016/0062352 A1 Mar. 3, 2016

(30) Foreign Application Priority Data

Aug. 28, 2014 (JP) .................................. 2014-174484

(51) Int. Cl.
*G05B 19/418* (2006.01)

(52) U.S. Cl.
CPC .................. *G05B 19/41865* (2013.01); *G05B 2219/31376* (2013.01); *Y02P 90/14* (2015.11); *Y02P 90/20* (2015.11)

(58) Field of Classification Search
None
See application file for complete search history.

(56) References Cited

U.S. PATENT DOCUMENTS 7,676,296 B2 * 3/2010 Fujii .................... G05B 19/048
700/108

FOREIGN PATENT DOCUMENTS

| JP | 2002-041124 | 2/2002 |
| JP | 2005-208889 | 8/2005 |
| JP | 2006-024742 | 1/2006 |

* cited by examiner

*Primary Examiner* — Carlos Ortiz Rodriguez
(74) *Attorney, Agent, or Firm* — Finnegan, Henderson, Farabow, Garrett & Dunner, L.L.P.

(57) ABSTRACT

The process flow checking system includes a manufacturing route generator, a rule-information storage part, and a check processor. The manufacturing route generator generates manufacturing route information while associating additional information indicating, contents of respective processes in a semiconductor process flow with the respective processes. The rule-information storage part stores therein rule information in which a rule about an order of processes in the manufacturing route information is described by using expressions included in the additional information. The check processor checks appropriateness of the order of processes in the manufacturing route information by comparing the additional information of the manufacturing route information with the rule information.

11 Claims, 4 Drawing Sheets

PROCESS FLOW CHECKING SYSTEM, RECORDING MEDIUM, AND PROCESS FLOW CHECKING METHOD

CROSS REFERENCE TO RELATED APPLICATIONS

This application is based upon and claims the benefit of priority from the prior Japanese Patent Application No. 2014-174484, filed on Aug. 28, 2014, the entire contents of which are incorporated herein by reference.

FIELD

Embodiments described herein relate generally to a process flow checking system, a recording medium, and a process flow checking method.

BACKGROUND

In order to manufacture semiconductor devices, semiconductor wafers are processed according to a semiconductor process flow (hereinafter, also "process flow") in a semiconductor manufacturing line. The process flow is information in which a plurality of processes are ordered.

In a semiconductor manufacturing line, a plurality of semiconductor wafers are processed as one lot. Conventionally, when a lot is processed, the process flow corresponding to the lot is manually checked. However, when process flows are manually checked, a lot of time and labor are required for the checking. Furthermore, if there is a mistake in the checking and the order of processes in the process flow is not appropriate, there is a possibility that the semiconductor line, the semiconductor manufacturing device, or the lot is contaminated, and then yield reduction, reliability degradation, and productivity reduction may be caused.

DETAILED DESCRIPTION

A process flow checking system according to an embodiment comprises a manufacturing route generator, a rule-information storage part, and a check processor. The manufacturing route generator generates manufacturing route information while associating additional information indicating contents of respective processes in a semiconductor process flow with the respective processes. The rule-information storage part stores therein rule information in which a rule about an order of processes in the manufacturing route information is described by using expressions included in the additional information. The check processor checks appropriateness of the order of processes in the manufacturing route information by comparing the additional information of the manufacturing route information with the rule information.

Embodiments of the present invention will now be explained with reference to the accompanying drawings. The present invention is not limited to the embodiments.

Figure 1A:
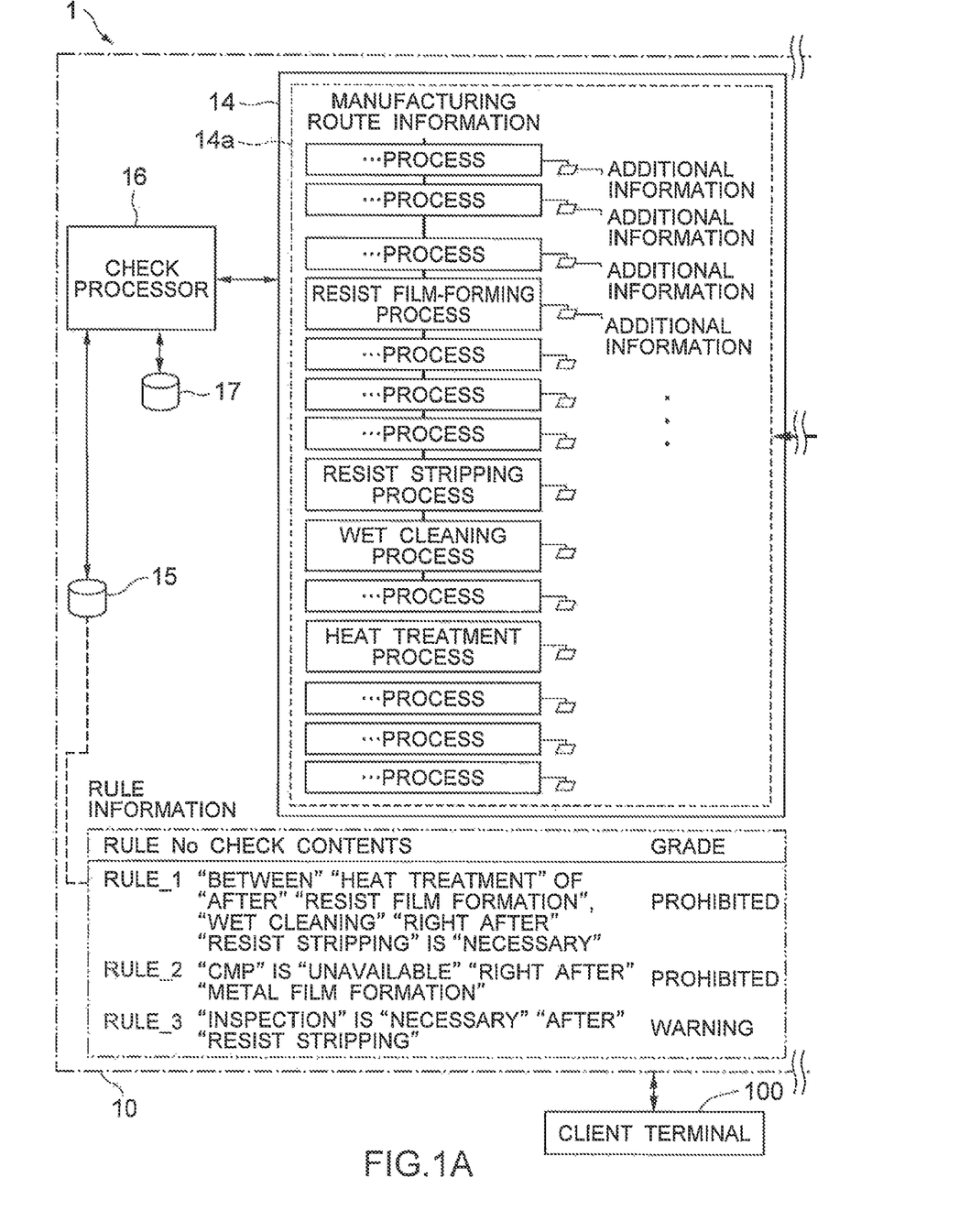
FIGS. 1A and 1B are block diagrams of a process flow checking system 1 according to an embodiment.
Figure 1B:
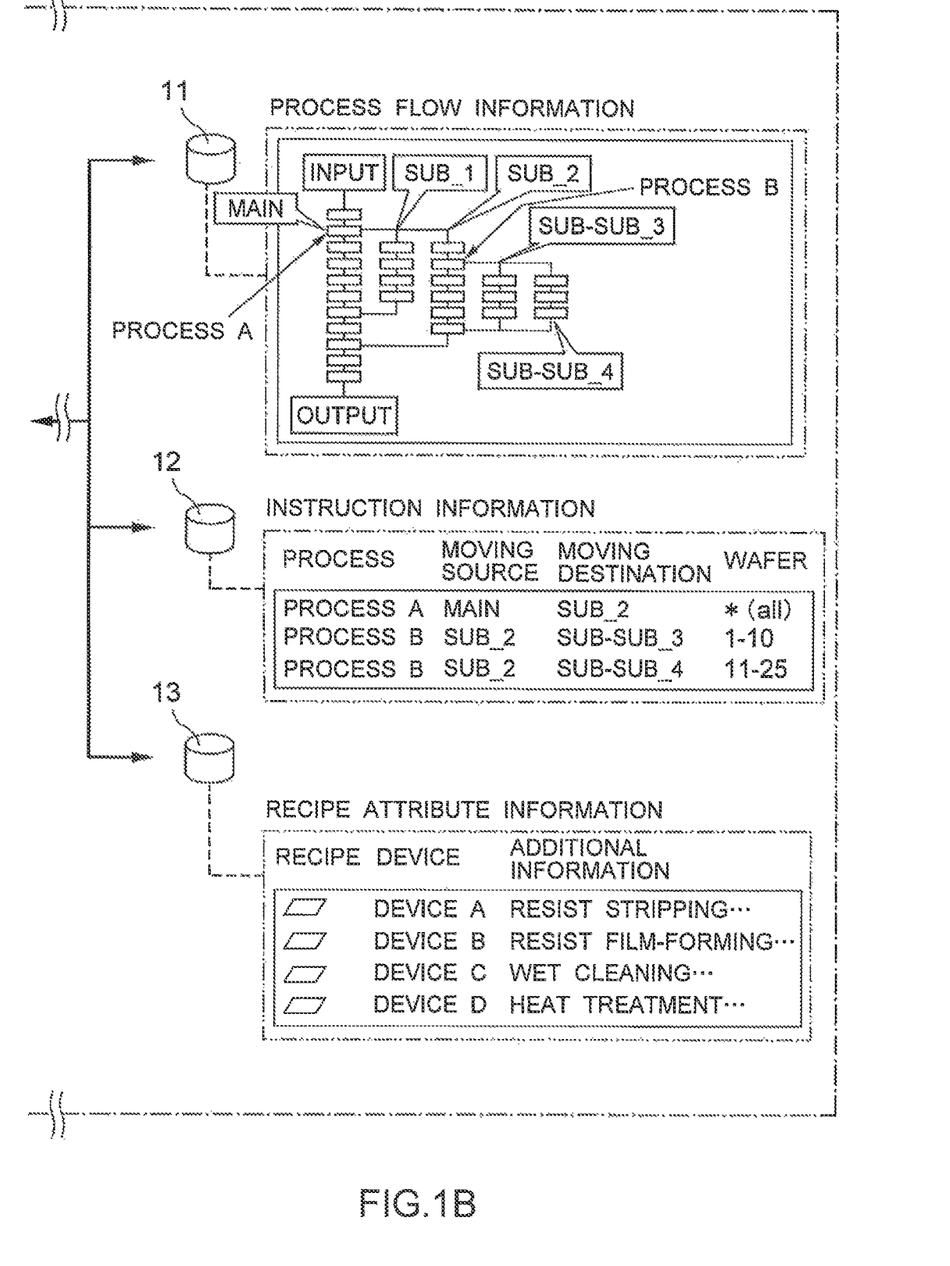

FIG. 1A is a first block diagram of a process flow checking system 1 according to an embodiment. FIG. 1B is a second block diagram of the process flow checking system 1. As shown in FIGS. 1A and 1B, the process flow checking system 1 includes a server 10 (in other words, a process flow checking device) and a client terminal 100. The server 10 and the client terminal 100 are configured to be communicable with the Internet and the like via an external network.

The server 10 includes a flow-information storage part 11, an instruction-information storage part 12, a recipe-attribute-information storage part 13, a manufacturing route generator 14, a rule-information storage part 15, and a check processor 16.

(Flow-Information Storage Part 11)

The flow-information storage part 11 stores therein information of a plurality of semiconductor process flows (hereinafter, the information is also referred to as "process flow information"). The process flow information can be created by ordering a plurality of processes in a semiconductor manufacturing process. These processes are processing necessary for manufacturing semiconductor devices, such as a heat treatment process, a CMP (Chemical Mechanical Polishing) process, a photolithography process, an etching process, a film forming process, and an inspection process. Respective processes in the process flow information are associated with processing conditions (recipe information) of semiconductor wafers. In order to manufacture various types of semiconductor devices, a number of pieces of process flow information are created in advance and stored in the flow-information storage part 11. When a certain semiconductor device is manufactured, process flow information corresponding to the semiconductor device is selected from the flow-information storage part 11.

Process flow information is schematically shown in FIG. 1B. The process flow information includes a plurality of selectable routes. For example, as shown in FIG. 1B, the process flow information can include, in addition to a main route, branch routes such as sub_1, sub_2, sub-sub_3, sub-sub_4. A lot as a processing target is processed with a route according to instruction information described later. A plurality of wafers in the lot can be processed with respectively different routes according to the instruction information.

(Instruction-Information Storage Part 12)

The instruction-information storage part 12 stores therein instruction information for instructing a route with which wafers are to be processed, among a plurality of routes included in the process flow information. The instruction information is created in advance when a lot is sent and is stored in the instruction-information storage part 12.

The instruction information shown in FIG. 1B is information in which information indicating a process right before branching a route, information indicating a route of a moving source (that is, a branching source), information indicating a route of a moving destination (that is, a branching destination), and information indicating wafers in a lot are associated with each other. In the instruction information, the instructed route can be different for each lot or each wafer. For example, with the instruction information shown in FIG. 1B, after performing a process A, all wafers in a lot are moved from a main route to the sub_2. With this operation, the lot is processed in the route of the sub_2. Thereafter, after performing a process B of the sub_2, wafers No. 1 to No. 10 in the lot are moved to the sub-sub_3, and wafers No. 11 to No. 25 are moved to the sub-sub_4. With this operation, the wafers No. 1 to No. 10 are processed in the route of the sub-sub_3, and the wafers No. 11 to No. 25 are processed in the route of sub-sub_4. In this manner, by referring to the instruction information, it is possible to recognize in what route the lot and wafers in the lot are processed.

(Recipe-Attribute-Information Storage Part 13)

The recipe-attribute-information storage part 13 stores therein recipe attribute information indicating attributes of processing conditions. The recipe attribute information shown in FIG. 1B is information in which recipe information, device information, and additional information are associated with each other, and the recipe attribute information indicates a specific processing method in respective processes. The recipe information includes a corresponding process name, processing conditions in the process, and the like. The device information includes a name of a device used in a corresponding process or a device number and the like. The additional information indicates specific processing contents of a corresponding process, and includes keyword information indicating the processing contents of the process. The additional information can also include, for example, information indicating with what extent of film thickness resist film formation is performed. Furthermore, as described later, the additional information can be used for checking a process flow.

One of more pieces of recipe attribute information are created in advance for respective processes, and are stored in the recipe-attribute-information storage part 13. When a certain semiconductor device is manufactured, corresponding recipe attribute information is selected from the recipe-attribute-information storage part 13 for respective processes in process flow information corresponding to the semiconductor device.

(Manufacturing Route Generator 14)

The manufacturing route generator 14 creates product route information by associating additional information indicating contents of respective processes of a semiconductor process flow with the respective processes. The manufacturing route generator 14 creates the manufacturing route information based on process flow information selected from the flow-information storage part 11, instruction information selected from the instruction-information storage part 12, and recipe attribute information selected from the recipe-attribute-information storage part 13. The manufacturing route generator 14 can be a processor of the server 10 or of a computer. Furthermore, the process flow information, the instruction information, and the recipe attribute information can be selected by an operator of a client terminal, or can be automatically selected by the manufacturing route generator 14.

The manufacturing route information is process flow information suited to a certain wafer or a certain lot sent to a semiconductor manufacturing line for manufacturing a certain semiconductor device, and is information indicating a route selected to process the lot. As shown in FIG. 1A, in the manufacturing route information, respective processes are associated with the recipe attribute information. Needless to mention, keyword information included in the additional information is also associated with these processes.

For example, the manufacturing route generator 14 generates the manufacturing route information by associating respective processes in the process flow information, the instruction process corresponding to the respective processes, and the recipe attribute information corresponding to the respective processes. The manufacturing route generator 14 stores the manufacturing route information in a manufacturing-route storage part 14a as a storage area of the manufacturing route generator 14.

(Rule-Information Storage Part 15)

The rule-information storage part 15 stores therein rule information. The rule information is information in which a rule about an order of processes in manufacturing route information is described by using expressions included in additional information. For example, as shown in FIG. 1A, the rule information is information in which rule number information indicating a reference number of a rule, check contents information indicating check contents of the check processor 16, and grade information indicating a grade of the rule are associated with each other.

The check contents information includes keyword information (for example, "resist film formation"), order information (for example, "right after"), and necessity information (for example, "necessary"). The keyword information indicates processing contents corresponding to a certain process. The order information indicates an order of plural pieces of information. The order information can be any mode as far as it is information specifying an order of checking the keyword information by the check processor 16. The necessity information indicates whether conformation to a series of keyword strings of rule information having been ordered by the order information is necessary by a certain rule. Therefore, when the necessity information indicates "necessary", the order of processes in a manufacturing route conforming to keyword strings of the rule information means the order of processes in the manufacturing route is appropriate (that is, the manufacturing route is conforming to the rule). On the other hand, when the necessity information indicates "unavailable", the order of processes in a manufacturing route conforming to keyword strings of the rule information means the order of processes in the manufacturing route is inappropriate (that is, the manufacturing route is violating the rule).

The grade information indicates the importance of the order of processes in a manufacturing route conforming to the rule. The grade information can be varied according to the corresponding rule. For example, when the importance is high, it is indicated as "prohibited", and when the importance is low, it is indicated as "warning". When a certain manufacturing route is determined to be inappropriate, the check processor 16 can transmit grade information of a rule that has become a determination target to the client terminal 100. When the grade information transmitted to the check processor 16 is "prohibited", an operator of the client terminal 100 re-selects process flow information, instruction information, or recipe attribute information, and the manufacturing route generator 14 recreate manufacturing route information. When the grade information transmitted from the check processor 16 is "warning", the operator of the client terminal 100 can re-select the process flow information, the instruction information, or the recipe attribute information, and if there is no problem, the manufacturing route information can be used as it is.

While three pieces of information, which are rule_1, rule_2, and rule_3, are schematically shown in FIG. 1A, these pieces of rule information are explained later in detail.

(Check Processor 16)

The check processor 16 is a processor of the server 10, that is, a computer. The check processor 16 executes a process-flow check program that is stored in a program storage part 17 of the server 10, that is, in a computer readable storage medium. The process-flow check program causes the check processor 16 to execute the following procedures.

(1) A first procedure of reading manufacturing route information from the storage area 14a of the manufacturing route generator 14.

(2) A second procedure of reading rule information from the rule-information storage part 15.

(3) A third procedure of checking appropriateness of the order of processes in manufacturing route information by comparing additional information in the manufacturing route information read in the first procedure with the rule information read in the second procedure.

In the third procedure, the check processor 16 compares keyword information of additional information associated with respective processes in manufacturing route information and the order of the keyword information in the manufacturing route information with keyword information included in rule information and order information, respectively. With this comparison, the check processor 16 can check the appropriateness of the manufacturing route.

Furthermore, the check processor 16 can check the manufacturing route information in the first to third procedures described above in response to a request from the client terminal 100. Alternatively, the check processor 16 can automatically start checking of the manufacturing route information upon completion of creating the manufacturing route information. The check processor 16 then notifies the checking result to the client terminal 100.

(Specific Example of Rule Information)

Figure 2:
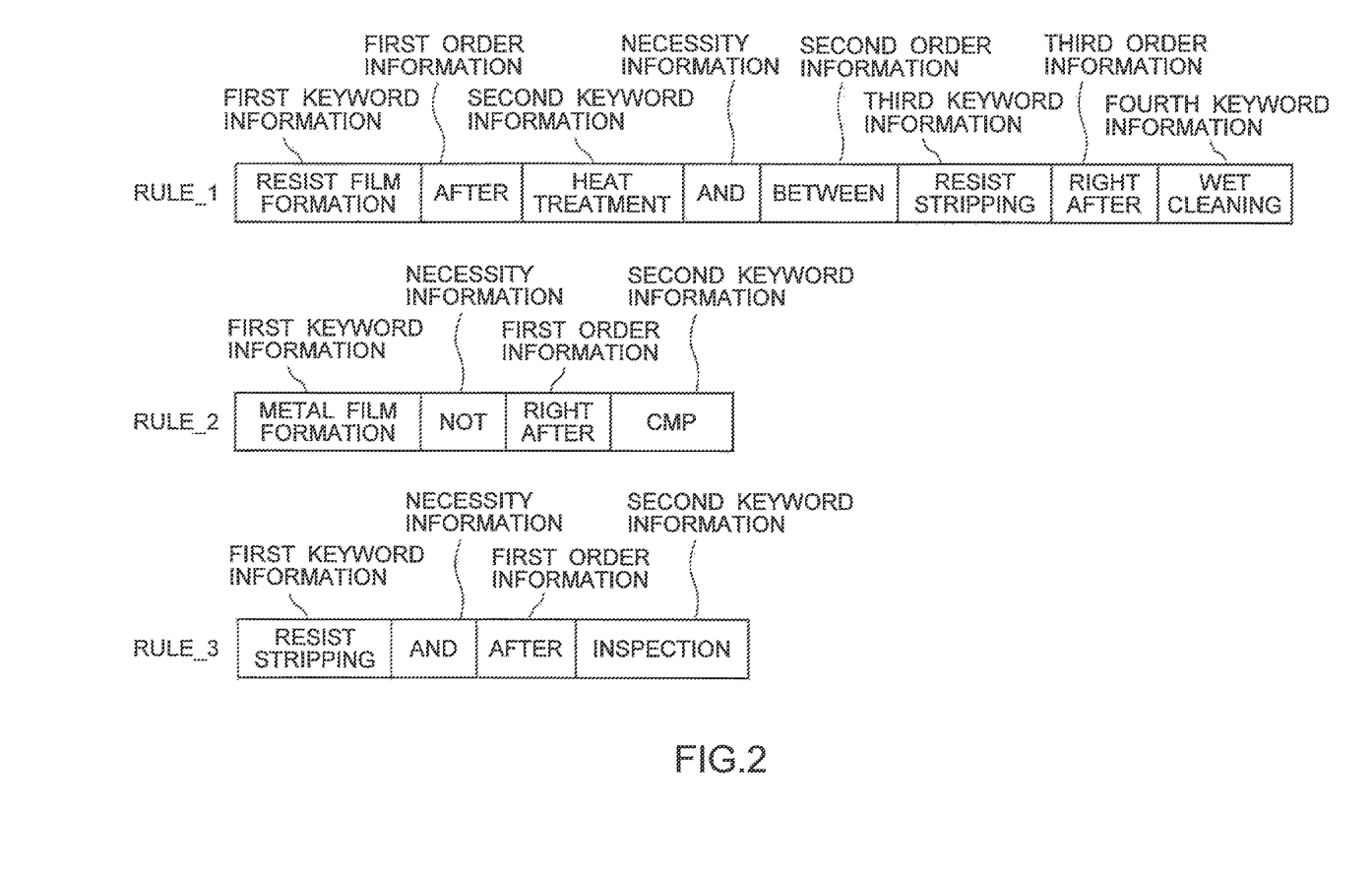
FIG. 2 is a schematic diagram of rule information in the process flow checking system 1 shown in FIG. 1.

FIG. 2 is a schematic diagram of rule information in the process flow checking system 1 shown in FIG. 1. In FIG. 2, in each of the rule_1, rule_2, and rule_3, constituent parts of check contents information are arranged in the order of recognition by the check processor 16.

(Check Contents Information of Rule_1)

If heat treatment is performed in a state where a resist is formed on a wafer, the semiconductor manufacturing device is contaminated by the resist. As a result, productivity reduction is caused due to stoppage of the device. Therefore, in order to precautionary avoid such inconveniences with a checking process, the rule_1 is set. When a heat treatment process is performed after a resist film-forming process, the rule_1 specifies that, during the both processes, a resist stripping process and a wet cleaning process right after the resist stripping process are necessary to be performed.

Specifically, the check contents information of the rule_1 includes pieces of information in the following order: first keyword information indicating "resist film formation"; first order information indicating "after"; second keyword information indicating "heat treatment"; necessity information indicating "AND" and "necessity"; second order information indicating "between"; third keyword information indicating "resist stripping"; third order information indicating "right after"; and fourth keyword information indicating "wet cleaning".

According to the check contents information of the rule_1 described above, the check processor 16 operates as follows by executing a process-flow check program. First, the check processor 16 searches for "resist film formation" (first keyword information) from manufacturing route information.

When "resist film formation" is detected, the check processor 16 then searches for "heat treatment" (second keyword information) according to "after" (first order information) and towards the downward direction in the manufacturing route information, that is, a direction towards the subsequent processes. Meanwhile, when "resist film formation" has not been detected in all the processes in the manufacturing route information, the check processor 16 can shift to a checking process of a manufacturing route based on a rule other than the rule_1.

After detecting "resist film formation", when "heat treatment" is detected, the check processor 16 recognizes that, according to "AND" (necessity information), inclusion of keyword strings subsequent to "AND" is necessary for conformation to the rule_1. Thereafter, according to "between" (second order information), the check processor 16 searches for "resist stripping" (third keyword information), while setting a process between a heat treatment process that is associated with "heat treatment" lastly detected at present and a resist film-forming process that is associated with "resist film formation" right before the lastly detected "heat treatment" is designated as a search area. The order information "between" is not limited to the mode in which a process between a process associated with keyword information lastly detected at present and a process right before the lastly detected process is designated as a search area, and a mode in which a process between two processes before the above mentioned processes is designated as a search area. Meanwhile, when "heat treatment" is not detected after the process of "resist film formation", the check processor 16 can shift to a checking process of the manufacturing route based on a rule other than the rule_1.

In this embodiment, the keyword strings of "resist film formation" and "heat treatment" mentioned above, which are processed before "AND", specify a fact that the rule_1 is a rule for a case when "heat treatment" is performed after "resist film formation". The configuration in which keyword strings or keywords before the necessity information specify a target of the corresponding rule can be also applied to rules other than the rule_1. Therefore, a case where any keyword string before "AND" is not detected in manufacturing route information does not mean a violation to the rule_1, unlike a case where any keyword string after "AND" is not detected in manufacturing route information. The case where any keyword string before "AND" is not detected only means that there is no application target of the rule_1 in a certain manufacturing route. In this way, when there is no application target of the rule_1 in a certain manufacturing route, the check processor 16 can output a checking result same as that of a case where the rule_1 is conformed, or can output an indication that there is no checking target.

After detecting "heat treatment", when "resist stripping" is detected, according to "right after" (third order information), the check processor 16 searches for "wet cleaning" (fourth keyword information), while a process subsequent to a resist stripping process that is associated with "resist stripping" lastly detected at present is designated as a search area. Meanwhile, when "resist stripping" is not detected in the search area, the check processor 16 determines that the order of processes in the manufacturing route violates the rule_1 and is inappropriate (that is, fail).

After detecting "resist stripping", when "wet cleaning" is detected, the check processor 16 determines that the order of processes in the manufacturing process is an appropriate order that conforms to the rule_1 (that is, pass). Meanwhile, when "wet cleaning" is not detected in a process subsequent to "resist stripping" in the search area, the check processor 16 determines that the order of processes in the manufacturing route is inappropriate, that is, fail.

By performing such a checking process of the manufacturing route based on the rule_1, it is possible to precautionary avoid inconveniences that heat treatment is performed in a state where a resist is formed on a wafer. The first rule can specify that heat treatment right after resist film formation cannot be performed.

(Check Contents Information of Rule_2)

If CMP is performed right after metal film formation is performed on a wafer, the semiconductor manufacturing device is contaminated with metal scraped by the CMP. As a result, productivity reduction is caused due to stoppage of the device. Therefore, in order to precautionary avoid such inconveniences with a checking process, the rule_2 is set. The rule_2 specifies that, when a metal film-forming process is included in a manufacturing route, a CMP process right after the metal film-forming process cannot be performed.

Specifically, the check contents information of the rule_2 includes pieces of information in the following order: first keyword information indicating "metal film formation"; necessity information indicating "NOT", that is, "unavailable"; first order information indicating "right after"; and second keyword information indicating "CMP".

According to the check contents information of the rule_2, the check processor 16 operates as follows by executing a process-flow check program. When "CMP" is detected as the process subsequent to "metal film formation", the check processor 16 determines that, based on the necessity information "NOT", the order of processes in the manufacturing route violates the rule_2 (that is, inappropriate). Meanwhile, when "CMP" is not detected as the process subsequent to "metal film formation", the check processor 16 determines that the order of processes in the manufacturing route conforms to the rule_2 (that is, appropriate).

By performing such a checking process of the manufacturing route based on the rule_2, it is possible to precautionary avoid performing CMP right after metal film formation.

(Check Contents Information of Rule_3)

After stripping a resist from a wafer, if an inspection for checking the stripping state is not conducted, as processes subsequent to the stripping (for example, a heat treatment process and a film forming process) are performed while the stripping of the resist is incomplete, contamination of the device and manufacturing failure may be caused. Therefore, in order to precautionary avoid such inconveniences with a checking process, the rule_3 is set. The rule_3 specifies that, when a resist stripping process is included in a manufacturing route, an inspection process after a resist stripping process is necessary.

Specifically, the check contents information of the rule_3 includes pieces of information in the following order: first keyword information indicating "resist stripping"; necessity information indicating "AND"; first order information indicating "after"; and second keyword information indicating "inspection".

According to the check contents information of the rule_3, the check processor 16 operates as follows by executing a process-flow check program. When "inspection" is detected as a process subsequent to "resist stripping", the check processor 16 determines that, based on the necessity information "AND", the manufacturing route conforms to the rule_3 (that is, appropriate). Meanwhile, when "inspection" is not detected as the process subsequent to "resist stripping", the check processor 16 determines that the manufacturing route violates the rule_3 (that is, inappropriate).

By performing a checking process of the manufacturing route based on the rule_3 described above, it is possible to precautionary avoid inconveniences that wafers are processed in a state where resist stripping is incomplete.

The data structure of the check contents information is not limited to the mode shown in FIG. 2, as far as the check processor 16 can perform a checking process.

(Checking Process)

Figure 3A:
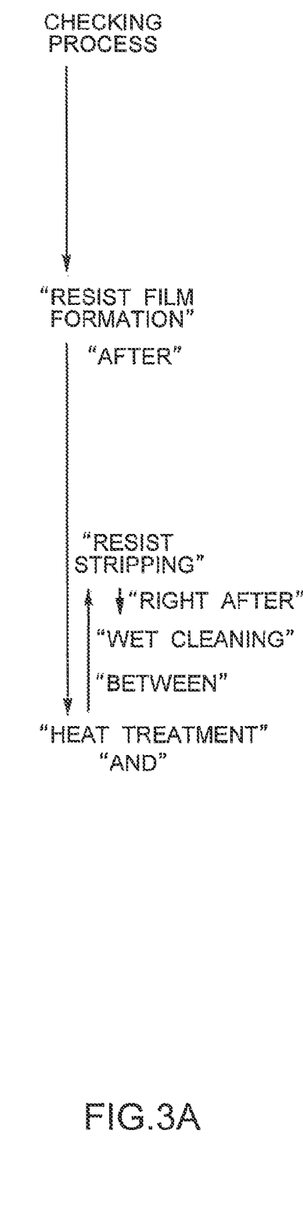
FIGS. 3A to 3C are explanatory diagrams of a checking process of the process flow checking system 1 shown in FIG. 1.
Figure 3B:
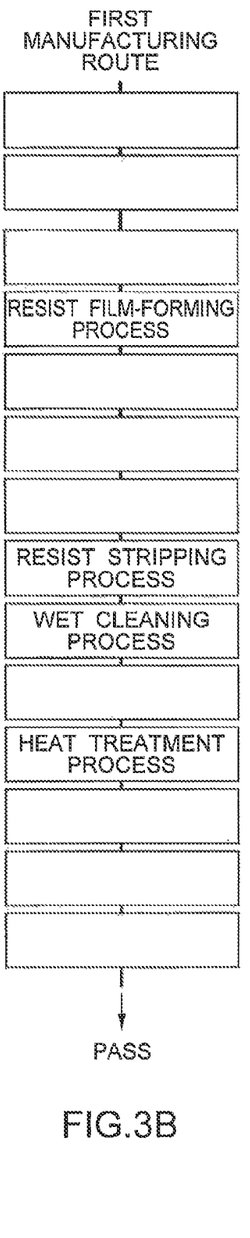
Figure 3C:
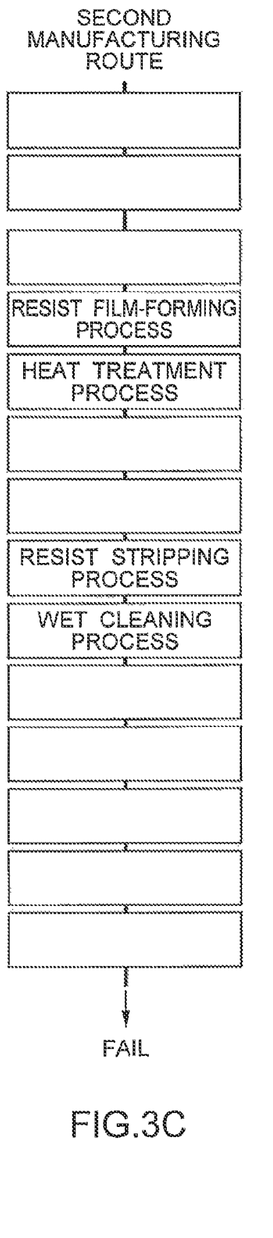

The checking process performed by the check processor 16 is explained in more detail with reference to FIGS. 3A to 3C. FIG. 3A is an explanatory diagram of a checking process by the process flow checking system 1 based on the rule_1. FIG. 3B is a schematic diagram showing a first manufacturing route as an example of a target of a checking process based on the rule_1. FIG. 3C is a schematic diagram showing a second manufacturing route as an example of a target of a checking process based on the rule_1.

In order to facilitate understanding of the order of checking processes of the first manufacturing route shown in FIG. 3B, in FIG. 3A, respective pieces of keyword information detected from the first manufacturing route are shown horizontally equally to corresponding processes in FIG. 3B, and searching directions of the respective pieces of keyword information are shown by arrows.

The first manufacturing route includes a resist film-forming process, a resist stripping process, a wet cleaning process, and a heat treatment process in this order, where the wet cleaning process is a process right after the resist stripping process. The second manufacturing route includes a resist film-forming process, a heat treatment process, a resist stripping process, and a wet cleaning process in this order, where the heat treatment process is a process right after the resist film-forming process. That is, while the first manufacturing route includes the resist stripping process and the wet cleaning process right after the resist stripping process between the resist film-forming process and the heat treatment process, the second manufacturing route does not include the resist stripping process and the wet cleaning process right after the resist stripping process between the resist film-forming process and the heat treatment process.

(Checking Process of First Manufacturing Route)

The check processor 16 searches for keyword information in the directions of the arrows in FIG. 3A with respect to the first manufacturing route, while referring to the check contents information of the rule_1 shown in FIG. 2.

As shown in FIG. 3A, when search for keyword information is started, the check processor 16 first searches for "resist film formation" (first keyword information) towards the downward direction, as the top process in the first manufacturing route in FIG. 3B is handled as the originating point of the search. Because the resist film-forming process is included in the first manufacturing route in FIG. 3 5, as the keyword information associated with the resist film-forming process, "resist film formation" is detected. The downward direction, which is the first searching direction, can be set as default.

Next, as shown in FIG. 3A, the check processor 16 searches for "heat treatment" (second keyword information) towards the downward direction while following "after" (first order information), as the resist film-forming process in FIG. 3 5 where "resist film formation" has been detected is handled as the originating point of the search. Because the heat treatment process as a process subsequent to the resist film-forming process is included in the first manufacturing route in FIG. 3 5, as the keyword information associated with the heat treatment process, "heat treatment" is detected.

Next, the check processor 16 recognizes that, based on "AND" (necessity information), conforming to subsequent keyword strings means conforming to corresponding rules. Subsequently, as shown in FIG. 3A, the check processor 16 searches for "resist stripping" (third keyword information) for which a process between the resist film-forming process and the heat treatment process is designated as a search area, while following "between" (second order information), as the heat treatment process in FIG. 3B where "heat treatment" has been detected is handled as the originating point of the search. At this time, as shown in FIG. 3A, the searching direction is the upward direction. Because the resist stripping process is included in the first manufacturing route in FIG. 3B between the resist film-forming process and the heat treatment process, as the keyword information associated with the resist stripping process, "resist stripping" is detected.

Next, as shown in FIG. 3A, the check processor 16 searches for "wet cleaning" (fourth keyword information) for which a process subsequent to the resist film-forming process is designated as a search area, towards the downward direction while following "right after" (third order information), as the resist stripping process in FIG. 3B where "resist stripping" has been detected is handled as the originating point of the search. In the first manufacturing route in FIG. 3B, because the process subsequent to the resist stripping process is the wet cleaning process, as the keyword information associated with the wet cleaning process, "wet cleaning" is detected.

With the above processes, the check processor 16 outputs a checking result indicating that the order of processes in the first manufacturing route is appropriate, which means "pass", in view of the first rule, and then the checking process is finished.

(Checking Process of Second Manufacturing Route)

The check processor 16 searches for keyword information with respect to the second manufacturing route in FIG. 3C, with procedures identical to those in the checking process of the first manufacturing route.

Because a resist film-forming process is included in the second manufacturing route in FIG. 3C, as the keyword information associated with the resist film-forming process, "resist film formation" is detected.

Furthermore, because a heat treatment process is included in the second manufacturing route as a process subsequent to the resist film-forming process, as the keyword information associated with the heat treatment process, "heat treatment" is detected.

However, any resist stripping process is not included in the second manufacturing route in FIG. 3C between the resist film-forming process and the heat treatment process, "resist stripping" is not detected.

At this point in time, the check processor 16 outputs a checking result indicating that the order of processes in the second manufacturing route is inappropriate, which means "fail", in view of the first rule, and then the checking process is finished.

The process flow checking system 1 according to the present embodiment employs the check processor 16 that can automatically check the appropriateness of manufacturing routes before processing lots according to the manufacturing routes. As a result, as compared to a case where process flows are manually checked, the time and labor required for the checking of process flows can be reduced. Further, in the process flow checking system 1, because checking mistakes do not occur, manufacturing failure such as accidents due to contamination can be securely suppressed.

Furthermore, the process flow checking system 1 includes, in the server 10, the flow-information storage part 11, the instruction-information storage part 12, the recipe-attribute-information storage part 13, the manufacturing route generator 14, the rule-information storage part 15, and the check processor 16. With this configuration, the cost and labor required for managing and processing data on the side of the client terminal 100 can be reduced. Note that the process flow checking system 1 can be a personal computer of a user. Further, because the check processor 16 can automatically check appropriateness of manufacturing route information according to a predetermined rule, data checking can be performed with high precision and high speed.

At least a part of the checking method in the process flow checking system according to the present embodiment can be configured by hardware or software. When the method is configured by software, the method can be formed such that a program for realizing at least a part of functions in a data processing method is stored in a recording medium such as a flexible disk or a CD-ROM, and the program executed by causing a computer to read the program. The recording medium is not limited to detachable devices such as a magnetic disk and an optical disk, and can be a fixed-type recording medium such as a hard disk device and a memory. Furthermore, the program realizing at least a part of the functions of the data processing method can be distributed via a communication line (including wireless communication) such as the Internet. Further, the program can be also distributed via a wired communication line such as the Internet or a wireless communication line in a state where the program is encrypted, modulated, or compressed, or distributed as the program is stored in a recording medium.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. A process flow checking system for checking a semiconductor process flow including a plurality of processes, the process flow checking system comprising:
a manufacturing route generator generating manufacturing route information indicating the processes arranged in a first order while associating additional information with the respective processes, the additional information including at least keyword information corresponding to the respective processes;
a rule-information storage part storing therein rule information indicating at least part of the processes arranged in a second order, the rule information including keyword information indicating processing contents corresponding to the processes indicated in the rule information and order information indicating an order of the keyword information included in the rule information; and
a check processor checking appropriateness of the order of the processes indicated in the manufacturing route information based on matching between the first order and the second order by comparing the keyword information of the processes indicated in the manufacturing route information and an order of the keyword information corresponding to the respective processes indicated in the manufacturing route information with the keyword information of the processes indicated in the rule information and the order information included in the rule information before processing wafers according to the manufacturing route information.

2. The system of claim 1, further comprising:
a flow-information storage part storing therein information of the semiconductor process flow in plural;
an instruction-information storage part storing therein, when a plurality of routes are included in the semiconductor process flows, instruction information instructing a route among the routes with which the wafers are to be processed; and
an additional-information storage part storing therein the additional information, wherein
the manufacturing route generator generates the manufacturing route information based on information of the semiconductor process flows, the instruction information, and the additional information.

3. The system of claim 1, further comprising:
a server including the manufacturing route generator, the rule-information storage part, and the check processor; and
a client terminal being connected to the server, wherein
the check processor checks appropriateness of the manufacturing route information in response to a request from the client terminal, and notifies a result of the checking to the client terminal.

4. The system of claim 1, further comprising:
a flow-information storage part storing therein information of the semiconductor process flow in plural;
an instruction-information storage part storing therein, when a plurality of routes are included in the semiconductor process flows, instruction information instructing a route among the routes with which the wafers are to be processed; and
an additional-information storage part storing therein the additional information, wherein
the manufacturing route generator generates the manufacturing route information based on information of the semiconductor process flows, the instruction information, and the additional information.

5. The system of claim 1, further comprising:
a server including the manufacturing route generator, the rule-information storage part, and the check processor; and
a client terminal being connected to the server, wherein
the check processor checks appropriateness of the manufacturing route information in response to a request from the client terminal, and notifies a result of the checking to the client terminal.

6. The system of claim 2, further comprising:
a server including the manufacturing route generator, the rule-information storage part, and the check processor; and
a client terminal being connected to the server, wherein
the check processor checks appropriateness of the manufacturing route information in response to a request from the client terminal, and notifies a result of the checking to the client terminal.

7. The system of claim 4, further comprising:
a server including the manufacturing route generator, the rule-information storage part, and the check processor; and
a client terminal being connected to the server, wherein
the check processor checks appropriateness of the manufacturing route information in response to a request from the client terminal, and notifies a result of the checking to the client terminal.

8. A non-transitory computer readable storage medium having a process-flow check program for checking a semiconductor process flow including a plurality of processes recorded therein, the program causing a computer to execute
a procedure of reading, from a manufacturing route generator that generates manufacturing route information indicating the processes arranged in a first order while associating additional information with the respective processes, the manufacturing route information, the additional information including at least keyword information corresponding to the respective processes,
a procedure of reading, from a rule-information storage part that stores therein rule information indicating at least part of the processes arranged in a second order, the rule information, the rule information including keyword information indicating processing contents corresponding to the processes indicated in the rule information and order information indicating an order of the keyword information included in the rule information, and
a procedure of checking appropriateness of the order of the processes indicated in the manufacturing route information based on matching between the first order and the second order by comparing the keyword information of the processes indicated in the read manufacturing route information and an order of the keyword information corresponding to the respective processes indicated in the read manufacturing route information with the keyword information of the processes indicated in the read rule information and the order information included in the read rule information before processing wafers according to the manufacturing route information.

9. A process flow checking method for checking a semiconductor process flow including a plurality of processes, the process flow checking method comprising:
reading, from a manufacturing route generator that generates manufacturing route information indicating the processes arranged in a first order while associating additional information with the respective processes, the manufacturing route information, the additional information including at least keyword information corresponding to the respective processes,
reading, from a rule-information storage part that stores therein rule information indicating at least part of the processes arranged in a second order, the rule information, the rule information including keyword information indicating processing contents corresponding to the processes indicated in the rule information and order information indicating an order of the keyword information included in the rule information, and
checking appropriateness of the order of processes indicated in the manufacturing route information based on matching between the first order and the second order by comparing the keyword information of the processes indicated in the read manufacturing route information and an order of the keyword information corresponding to the respective processes indicated in the read manufacturing route information with the keyword information of the processes indicated in the read rule information and the order information included in the read rule information before processing wafers according to the manufacturing route information.

10. The method of claim 9, wherein appropriateness of the manufacturing route information is checked in response to a request from a client terminal, and a result of the checking is notified to the client terminal.

11. The method of claim 9, wherein appropriateness of the manufacturing route information is checked in response to a request from a client terminal, and a result of the checking is notified to the client terminal.

* * * * *